US008203957B2

(12) United States Patent
Aoyama

(10) Patent No.: US 8,203,957 B2
(45) Date of Patent: Jun. 19, 2012

(54) RADIO COMMUNICATION TERMINAL DEVICE, RADIO COMMUNICATION CONTROL STATION DEVICE, AND RADIO COMMUNICATION METHOD

(75) Inventor: Takahisa Aoyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 746 days.

(21) Appl. No.: 12/281,461

(22) PCT Filed: Mar. 2, 2007

(86) PCT No.: PCT/JP2007/054021
§ 371 (c)(1),
(2), (4) Date: Dec. 9, 2008

(87) PCT Pub. No.: WO2007/100085
PCT Pub. Date: Sep. 7, 2007

(65) Prior Publication Data
US 2009/0219902 A1    Sep. 3, 2009

(30) Foreign Application Priority Data

Mar. 3, 2006   (JP) ................................. 2006-058342

(51) Int. Cl.
*H04B 7/00* (2006.01)
(52) U.S. Cl. ........................................ 370/241; 370/310
(58) Field of Classification Search .................. None
See application file for complete search history.

(56) References Cited

U.S. PATENT DOCUMENTS

| 2004/0005886 | A1* | 1/2004 | Oda et al. ................... 455/456.1 |
| 2004/0260805 | A1 | 12/2004 | Aoyama |
| 2005/0239461 | A1 | 10/2005 | Verma |
| 2005/0254469 | A1 | 11/2005 | Verma |
| 2006/0004643 | A1 | 1/2006 | Stadelmann |
| 2006/0052113 | A1* | 3/2006 | Ophir et al. ................ 455/456.1 |
| 2007/0291733 | A1* | 12/2007 | Doran et al. .................. 370/352 |

FOREIGN PATENT DOCUMENTS

| JP | 2004-056515 | 2/2004 |
| JP | 2005-523613 | 8/2005 |
| JP | 2005-531223 | 10/2005 |
| JP | 2005-539418 | 12/2005 |
| WO | 2005/125110 | 12/2005 |

OTHER PUBLICATIONS

International Search Report dated May 15, 2007 in English.
Japanese Office Action dated May 31, 2011.

* cited by examiner

*Primary Examiner* — Kevin C Harper
(74) *Attorney, Agent, or Firm* — Dickinson Wright PLLC

(57) ABSTRACT

Provided are a radio communication terminal device, a radio communication control station device, and a radio communication method capable of effectively managing a radio resource allocated to a terminal and context such as registration information when the terminal compatible with a plurality of different RATs moves between the RATs. According to them, when the WLAN Network control unit (110) detects the WLAN In Service state while the terminal (100) is connected to a Cellular Network, a RAT switching control unit (109) controls to switch the connection from the Cellular Network to the WLAN Network. When a timer (1) in the Cellular Network control unit (101) has expired, a registration update request is transmitted to the Cellular Network by using the WLAN and the Cellular Network exchange station updates the registration, thereby holding the context such as the registration information in the Cellular Network.

2 Claims, 11 Drawing Sheets

RADIO COMMUNICATION TERMINAL DEVICE, RADIO COMMUNICATION CONTROL STATION DEVICE, AND RADIO COMMUNICATION METHOD

TECHNICAL FIELD

The present invention relates to a radio communication terminal apparatus, radio communication control station apparatus and radio communication method.

BACKGROUND ART

One major objects of the long term evolution ("LTE") and system architecture evolution ("SAE"), which are standardized by the 3rd generation partnership project ("3GPP"), is to make a terminal compatible with a plurality of radio access technologies ("RATs") (see FIG. 1).

Examples of a plurality of RATs include the UTRAN, GERAN, E-UTRAN, WLAN 3GPP access system and non-3GPP access system and so on, as shown in FIG. 1. These RATs all have different characteristics (e.g. coverage, transmission rate, etc.), so studies are being underway to make effective use of their individual characteristics.

FIG. 2 illustrates, conceptually, the coverage of a plurality of RATs. Furthermore, with regard to the transmission rate, the RATs may be ranked in descending order of transmission rates from WLAN, E-UTRAN, UTRAN and so on. In this way, the UTRAN of the GPRS Network, which has a wide coverage may be applied to a fast moving terminal, while the WLAN may be applied to a terminal that does not frequently moving but requires fast communication.

However, the operation of a terminal compatible with a plurality of RATs upon changing the RAT to which the terminal is connected has not been discussed enough. To be more specific, it is only between GERAN and UTRAN in a GPRS Network that the current 3GPP specifies the operation of changing the RATs.

Features upon changing the RAT in the GPRS Network include: (1) the GPRS core having the functions of the NAS (Non Access Stratum) that performs the functions of registration, call control and authentication, does not change; (2) both the UTRAN and the GERAN are systems premised upon cellular systems and one of them is selected and used; and (3) the UTRAN is developed upon the basis of the GERAN and there is a high level of affinity between the UTRAN and the GERAN.

Therefore, based on the first feature, the process of call control is not influenced when a terminal changes the RAT it uses. Furthermore, from the second and third features, change between the UTRAN and the GERAN is made by a method of selecting one of the two systems and the system is a simple one that selects one of the two systems and then disconnects the other.

Non-Patent Document 1: 3GPP TR25.331, "radio resources Control (RRC) Protocol Specification"
Non-Patent Document 2: 3GPP TR24.008, "Mobile radio interface Layer 3 specification; Core network protocols; Stage 3"

DISCLOSURE OF INVENTION

Problems to be Solved by the Invention

However, the above-described features are not applicable to changes of the RAT between the GPRS Network and the Evolved Network or between the Evolved Network and the WLAN 3GPP Access System (i.e. hot spot, instead of cellular system), and it is necessary to consider optimal operations. To be more specific, it is necessary to manage, in an optimal fashion, both the context of the RAN having the function of the access stratum ("Access Stratum") that performs radio control, and the context of the CN having the function of the NAS.

For example, when a terminal moves from the GPRS Network or the Evolved Network to the WLAN, the radio resources assigned by the GPRS Network or the Evolved Network to the terminal are kept for a certain period of time to support a temporary end of communication but are preferably released immediately after the terminal moves to the WLAN for effective utilization of resources.

Furthermore, when the terminal moves from the GPRS Network or the Evolved Network to the WLAN, the context managed by the GPRS Network or the Evolved Network such as registration information, is discarded when there is no access for a certain period of time. However, given that the terminal may possibly return from the WLAN to the original network, the source network must keep the context.

Where a terminal supporting a plurality of different RATs moves between RATs, it is an object of the present invention to provide a radio communication terminal apparatus, radio communication control station apparatus and radio communication method for efficiently managing the radio resources assigned to the terminal and context such as registration information.

Means for Solving the Problem

The radio communication terminal apparatus according to the present invention is able to access a plurality of networks including a cellular network and a wireless LAN network, and has: a detection section that detects an in-service state or out-of-service state of each cellular network and wireless LAN network; a switching section that switches a network to which the apparatus is connected, based on the in-service state or the out-of-service state of the detected cellular network and wireless LAN network; and a requesting section that, when a connection to the cellular network is switched to a connection to the wireless LAN network, regularly requests the cellular network to keep a context including registration information in the cellular network via the wireless LAN network.

The radio communication control station apparatus according to the present invention receives a command for regularly requesting a cellular network to keep a context including registration information in a cellular network from a radio communication terminal apparatus, and makes the request according to that command.

The radio communication method according to the present invention regularly requests, when a radio communication terminal apparatus that is able to access a plurality of networks including a cellular network and a wireless LAN network switches a connection with the cellular network to a connection with the wireless LAN network, the cellular network to keep a context including registration information in the cellular network via the wireless LAN network.

Advantageous Effect of the Invention

Where a terminal supporting a plurality of different RATs moves between RATs, the present invention enables efficient management of radio resources assigned to the terminal and context such as registration information.

BEST MODE FOR CARRYING OUT THE INVENTION

Figure 1:
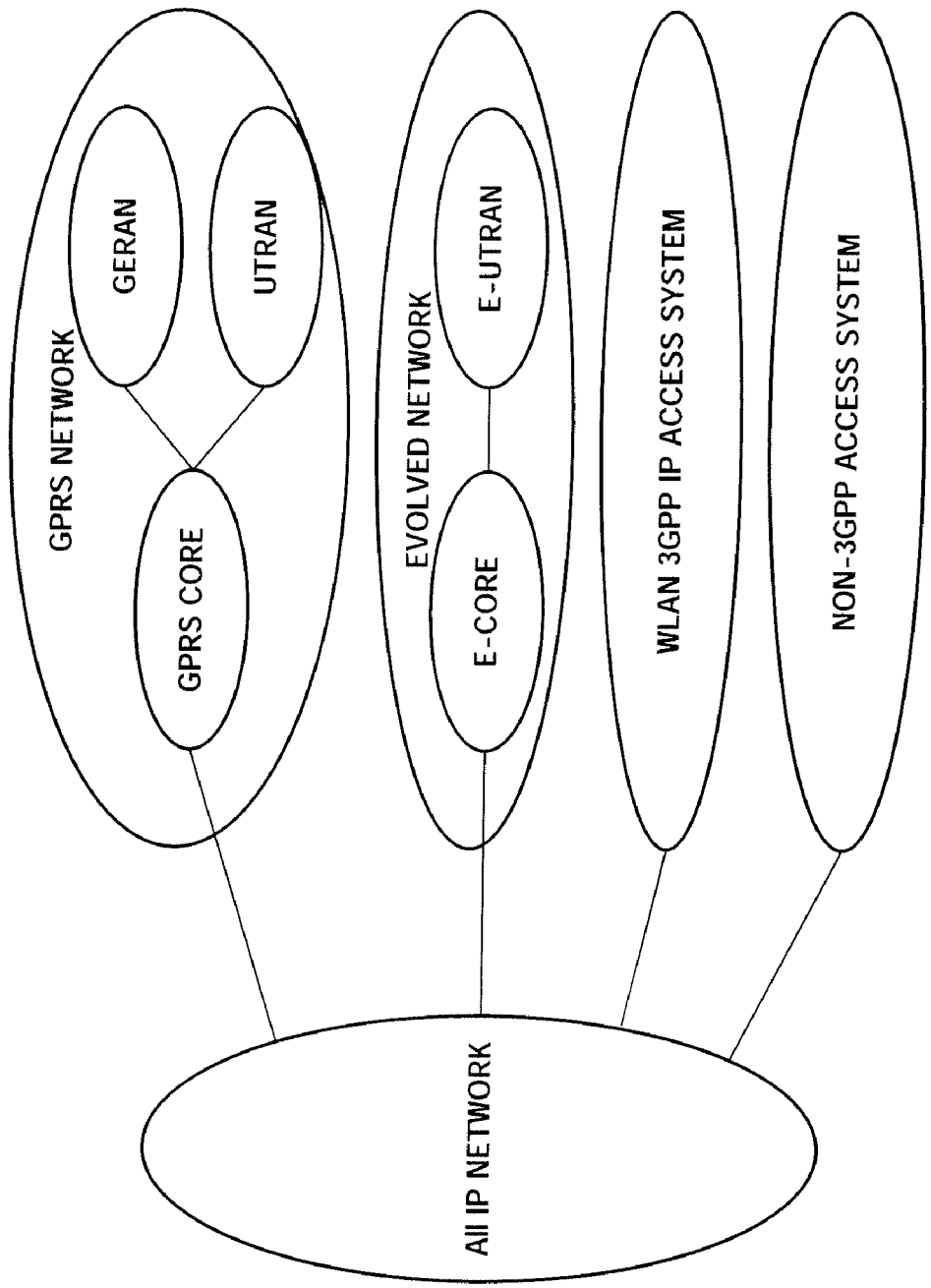
FIG. 1 is a conceptual diagram showing an architecture of a plurality of RATs.
Figure 2:
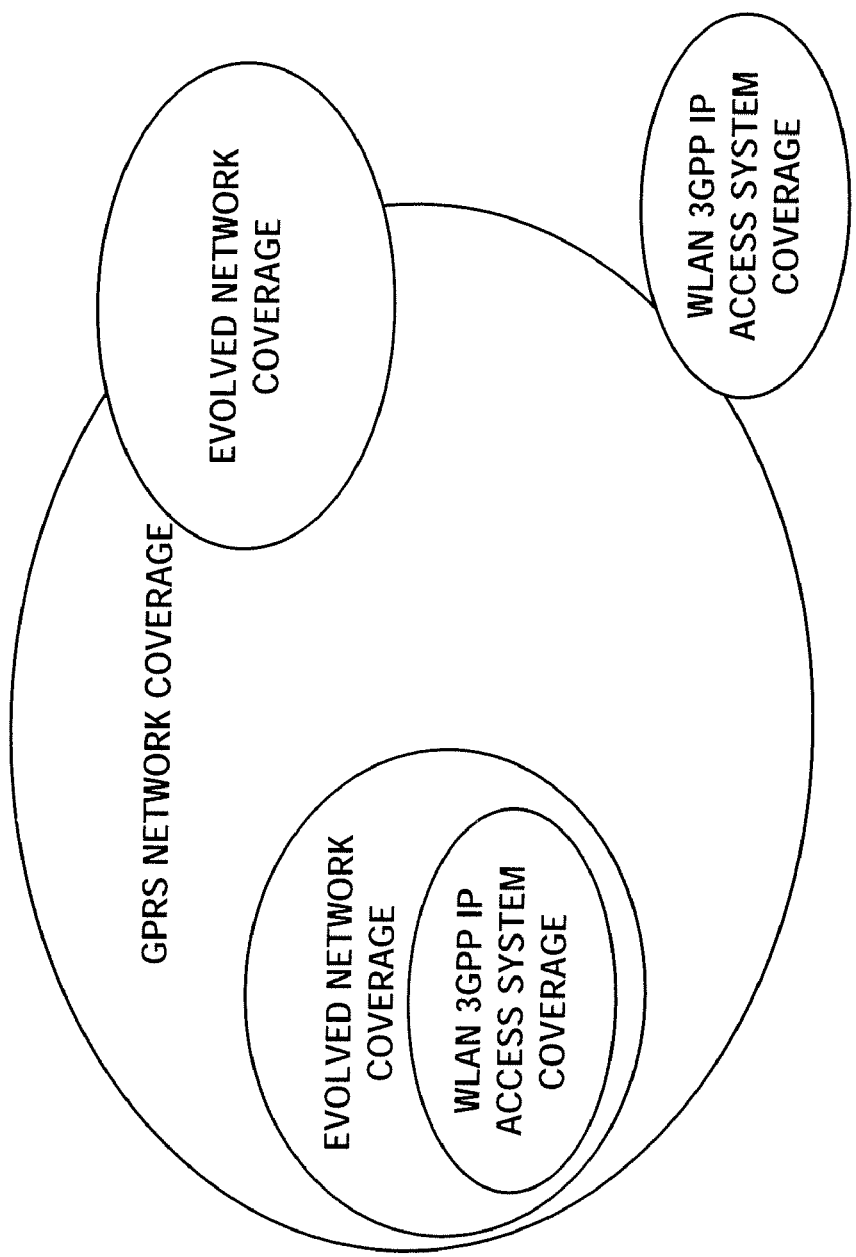
FIG. 2 is a conceptual diagram showing coverage of a plurality of RATs.

Now, embodiments of the present invention will be described in detail with reference to the accompanying drawings. However, components having the same functions between the embodiments will be assigned the same reference numerals and overlapping explanations will be omitted. In the following embodiments, a cellular system such as the GPRS Network and the Evolved Network will be referred to as a "cellular network" and a system that utilizes hot spots and so on will be referred to as a WLAN network (Wireless LAN network).

Embodiment 1

Figure 3:
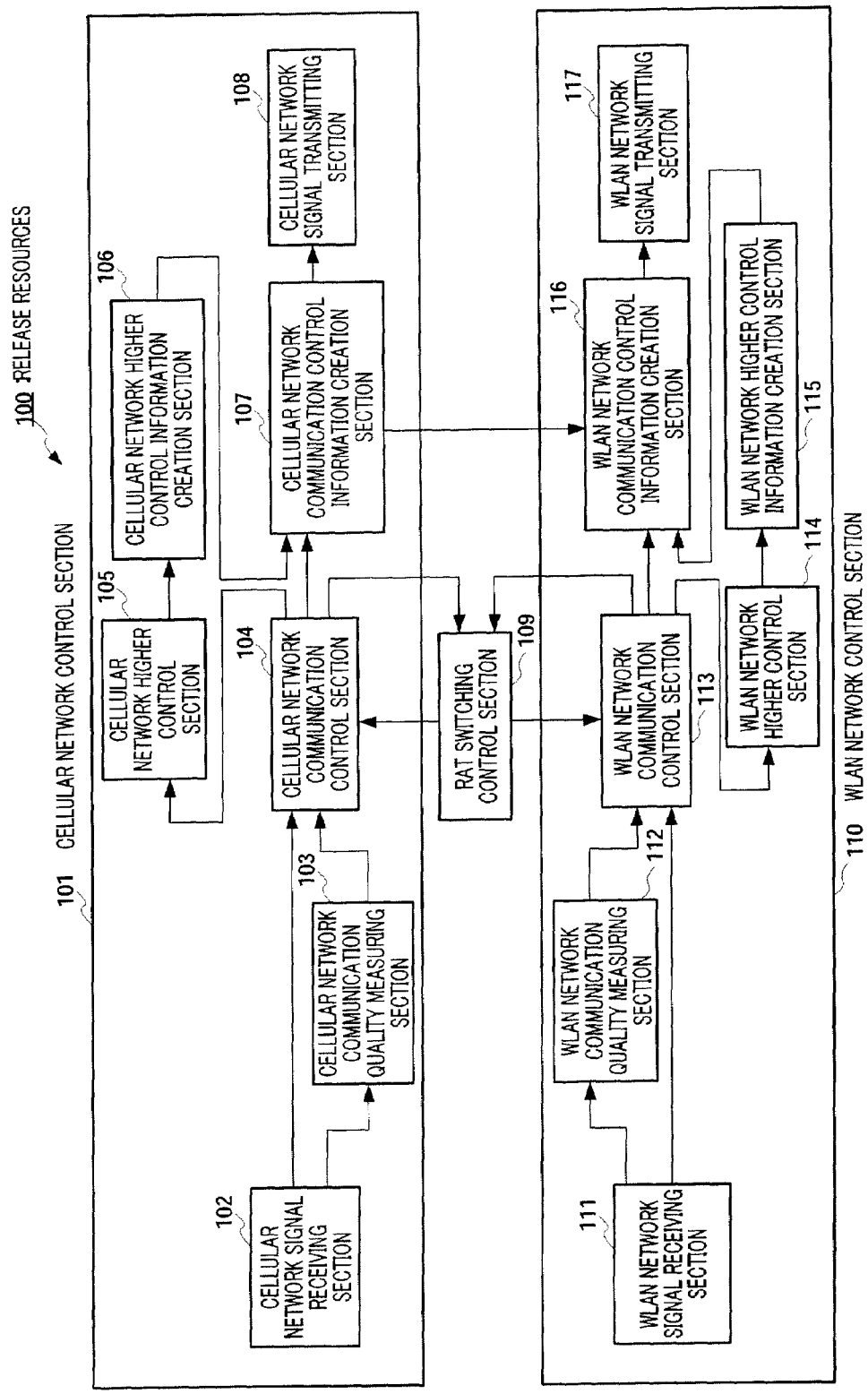
FIG. 3 is a block diagram showing a configuration of a terminal according to Embodiment 1 of the present invention.

FIG. 3 is a block diagram showing a configuration of terminal 100 according to Embodiment 1 of the present invention. As shown in this figure, a terminal has cellular network control section 101, WLAN network control section 110 and RAT switching control section 109.

First, cellular network control section 101 will be explained.

Cellular network signal receiving section 102 receives a signal transmitted from a cellular network via a radio channel and divides the signal into radio control information and radio quality measurement information. The radio quality measurement information is outputted to cellular network communication quality measuring section 103 and the radio control information is outputted to cellular network communication control section 104.

Cellular network communication quality measuring section 103 measures radio quality based on the radio quality measurement information outputted from cellular network signal receiving section 102 and outputs the measurement result to cellular network communication control section 104.

Cellular network communication control section 104 performs radio control in the cellular network based on the radio control information outputted from cellular network signal receiving section 102, radio quality measurement result outputted from cellular network communication quality measuring section 103 and RAT switching control information (e.g. presence/absence of RAT change, RAT addition, etc.) outputted from RAT switching control section 109. Cellular network communication control section 104 outputs the radio control content to cellular network communication control information creation section 107, outputs the control state (e.g., communication quality, service QoS information, etc.) of the cellular network to RAT switching control section 109 and furthermore outputs a message for a higher control section to cellular network higher control section 105. Furthermore, cellular network communication control section 104 as a requesting section manages a timer and makes a registration update request every time the timer expires.

Cellular network higher control section 105 performs processing such as registration, call control, authentication based on the higher control section message outputted from cellular network communication control section 104 and outputs higher control content for the cellular network to cellular network higher control information creation section 106.

Cellular network higher control information creation section 106 creates a control message using the higher control content outputted from cellular network higher control section 105 and outputs the control message to cellular network communication control information creation section 107.

Cellular network communication control information creation section 107 creates a control message for the cellular network based on the control content for the cellular network outputted from cellular network communication control section 104 and the control message outputted from cellular network higher control information creation section 106 and outputs the control message to cellular network signal transmitting section 108. Furthermore, cellular network communication control information creation section 107 outputs control information to WLAN network communication control information creation section 116.

Cellular network signal transmitting section 108 transmits the control message outputted from cellular network communication control information creation section 107 to the cellular network via a radio channel.

RAT switching control section 109 decides the switching RAT based on the control state of the cellular network outputted from cellular network communication control section 104 and returns RAT switching control information (i.e. presence/absence of RAT change, RAT addition, etc.) to cellular network communication control section 104. Furthermore, RAT switching control section 109 decides the switching RAT based on the control state of the WLAN network outputted from WLAN network communication control section 113 and returns RAT switching control information (i.e. presence/absence of RAT change, RAT addition, etc.) to WLAN network communication control section 113.

Next, WLAN network control section 110 will be explained.

WLAN network signal receiving section 111 receives a signal transmitted from the WLAN network via a radio channel and separates the signal into radio control information and radio quality measurement information. The radio quality measurement information is outputted to WLAN network communication quality measuring section 112 and the radio control information is outputted to WLAN network communication control section 113.

WLAN network communication quality measuring section 112 measures radio quality based on the radio quality measurement information outputted from WLAN network signal receiving section 111, and outputs the measurement result to WLAN network communication control section 113.

WLAN network communication control section 113 performs radio control over the WLAN network based on the radio control information outputted from WLAN network signal receiving section 111, radio quality measurement result outputted from WLAN network communication quality measuring section 112 and RAT switching control information (i.e. presence/absence of RAT change, RAT addition, etc.) outputted from RAT switching control section 109. WLAN network communication control section 113 outputs the radio control content to WLAN network communication control information creation section 116, outputs the control state (e.g. communication quality, service QoS information, etc.) of the WLAN network to RAT switching control section 109, and, furthermore outputs a higher control section message to WLAN network higher control section 114.

WLAN network higher control section 114 performs processing such as registration, call control and authentication based on the higher control section message outputted from WLAN network communication control section 113, and outputs the higher control content for the WLAN network to WLAN network higher control information creation section 115.

WLAN network higher control information creation section 115 creates a control message using the higher control content outputted from WLAN network higher control section 114 and outputs the control message to WLAN network communication control information creation section 116.

WLAN network communication control information creation section 116 creates a control message for the WLAN network based on the control content for the WLAN network outputted from WLAN network communication control section 113 and the control message outputted from WLAN network higher control information creation section 115, and outputs the control message to WLAN network signal transmitting section 117. Furthermore, WLAN network communication control information creation section 116 outputs the control information outputted from cellular network communication control information creation section 107 to WLAN network signal transmitting section 117. Cellular network communication control information creation section 107 and WLAN network communication control information creation section 116 function as a commanding means.

WLAN network signal transmitting section 117 transmits the control message outputted from WLAN network communication control information creation section 116 to the WLAN network via a radio channel.

Figure 4:
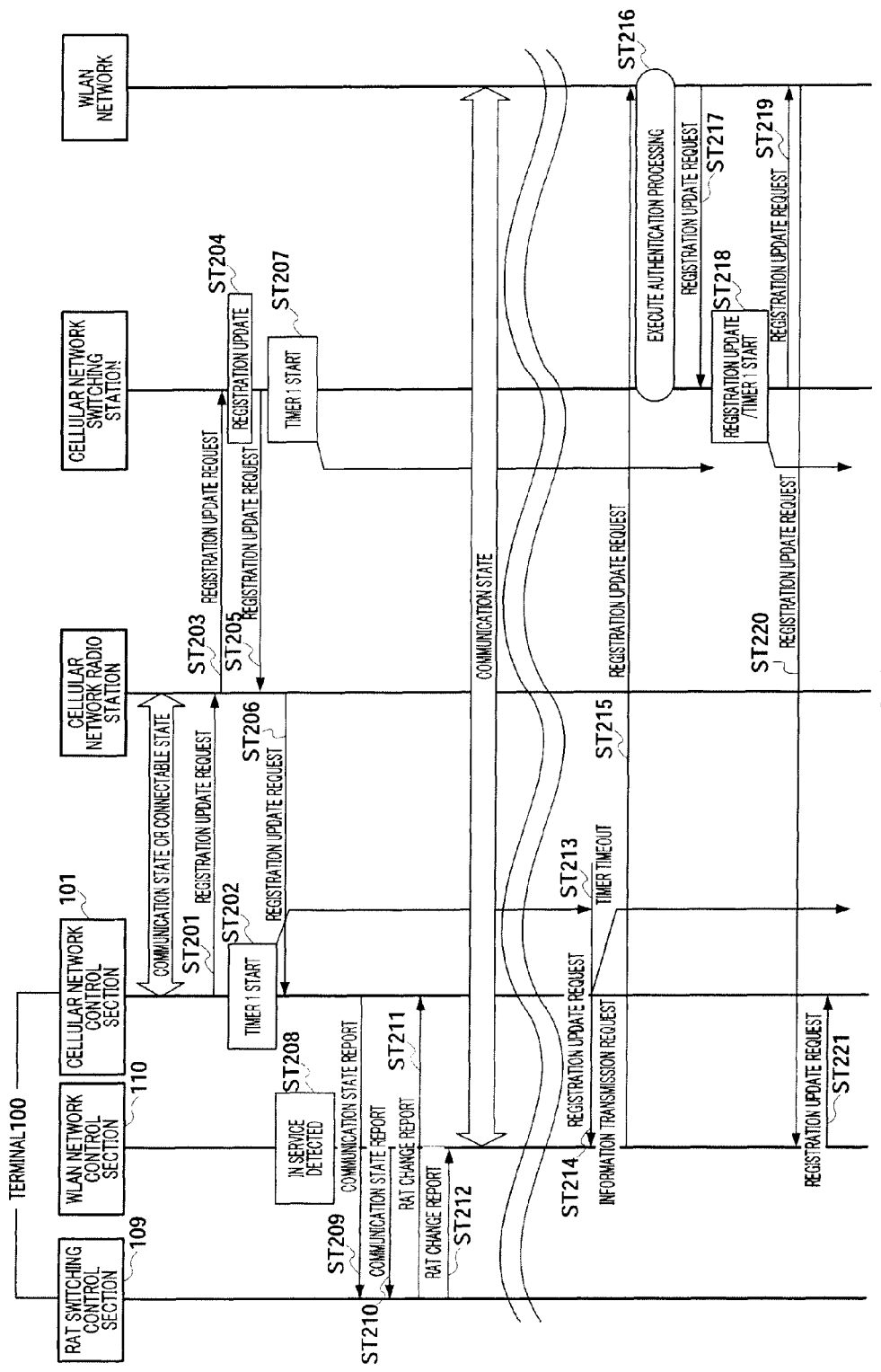
FIG. 4 is a sequence diagram showing steps of process of the terminal, radio station and switching station of the cellular network and the WLAN network shown in FIG. 3.

Next, the steps of process in terminal 100, radio station and switching station of the cellular network and the WLAN network in the above-described configuration, will be explained using FIG. 4. FIG. 4 shows a case where terminal 100 enters the coverage of the WLAN network while communicating with the cellular network, WLAN enters an in-service state and terminal 100 chooses communicating with the WLAN network.

Here, the registration information of terminal 100 kept in the cellular network switching station needs to be updated on a regular basis, and registration information is discarded if not updated more than a predetermined period of time. Therefore, timer 1 is used in terminal 1 and the network to measure the period of regular updating.

In FIG. 4, given conditions that cellular network control section 101 of terminal 100 is communicating or that is able to access the cellular network radio station, timer 1 expires in step (hereinafter simply "ST") 201, cellular network control section 101 sends a registration update request to the cellular network radio station and restarts after resetting timer 1 in ST202.

In ST203, the cellular network radio station transfers the registration update request to the cellular network switching station, and, in ST204, the cellular network switching station receives the registration update request and updates the registration, and, in ST205, the cellular network switching station sends a registration update response to the cellular network radio station. In ST206, the cellular network radio station transfers the registration update response to cellular network control section 101. On the other hand, in ST207, the cellular network switching station starts timer 1. This timer 1 is for monitoring whether or not the registration is going to be updated before the timeout and if the registration is not updated before the timeout, the registration information kept in the cellular network switching station is discarded.

Here, assuming that terminal 100 has entered the coverage of WLAN, in ST208, WLAN network control section 110 detects an in-service state of the WLAN, and, in ST209, cellular network control section 101 reports the communication state to RAT switching control section 109, and, in ST210, WLAN network control section 110 reports the communication state to RAT switching control section 109.

In ST211, RAT switching control section 109 reports a RAT change to cellular network control section 101, and, in ST212, RAT switching control section 109 reports the RAT change to WLAN network control section 110. By this means, WLAN network control section 110 of terminal 100 starts communicating with the WLAN network.

In ST213, timer 1 in cellular network control section 101 of terminal 100 expires, and, in ST214, cellular network control section 101 outputs a transmission request for registration update request information to WLAN network control section 110.

In ST215, WLAN network control section 110 transmits a registration update request to the WLAN network, and, in ST216, the WLAN network receives the registration update request, carries out authentication processing with the cellular network switching station, and, in ST217, the WLAN network transfers the registration update request to the cellular network switching station.

In ST218, the cellular network switching station receives the registration update request, updates the registration and restarts after resetting timer 1. In ST219, the cellular network switching station sends a registration update response to the WLAN network, and, in ST220, the cellular network switching station sends a registration update response to WLAN network control section 110 of terminal 100.

In ST221, WLAN network control section 110 of terminal 100 outputs a registration update response to cellular network control section 101.

Through these processings, terminal 100, when connected to the WLAN network, is able to keep context such as registration information in the cellular network via the WLAN. This eliminates the necessity for the use of resources of the cellular network and allows effective use of the radio resources. Furthermore, even when the terminal cannot access the cellular network, context such as registration information in the cellular network can be kept.

Here, information subject to registration updating will be explained. Examples of information subject to registration updating include The ID originally assigned to terminal 100, ID temporarily assigned to terminal 100, registration information such as Home IP address and care-of address, performance of terminal 100, position information of terminal 100, security information of terminal 100 (e.g., key number currently in use), service used, QoS information given to the service used and service level given by the operator to terminal 100 (identifiers of as general users, platinum users, etc.). However, information subject to registration updating is not limited to these.

This registration update may be used to change the above-described content or may also be used as a trigger for keeping content as is. Furthermore, when information is updated via the WLAN network, the information kept in the cellular network switching station may change to a case where the information is updated via the cellular network. For example, since the registration information of terminal 100 does not change, such control is possible that registration information is kept even when the registration information is updated via the WLAN network, and QoS given to the service is not kept (or kept when the registration information is updated via the cellular network) because QoS may change later. Furthermore, the difference between this cellular network and WLAN network may be made as a rule beforehand (i.e. standardized) or may be explicitly commanded when updating the information via the WLAN network.

According to the present embodiment, timer 1 is designed to start after the registration update request in ST201, but timer 1 may also be started before transmission in ST201 or started after receiving the registration update response (ST206) and the start timing of the timer is not specifically defined. The same applies to the start timing of the timer of the cellular network switching station.

Furthermore, the present embodiment assumes that the same timer is used for the terminal and the cellular network switching station, but the timer used for the cellular network switching station may also be configured to be slightly longer than the timer used for the terminal. That is, since a time lag is produced after the timer of the terminal expires until the cellular network switching station receives a message from the terminal, the timer is set to be a little longer in view of that lag.

Figure 5:
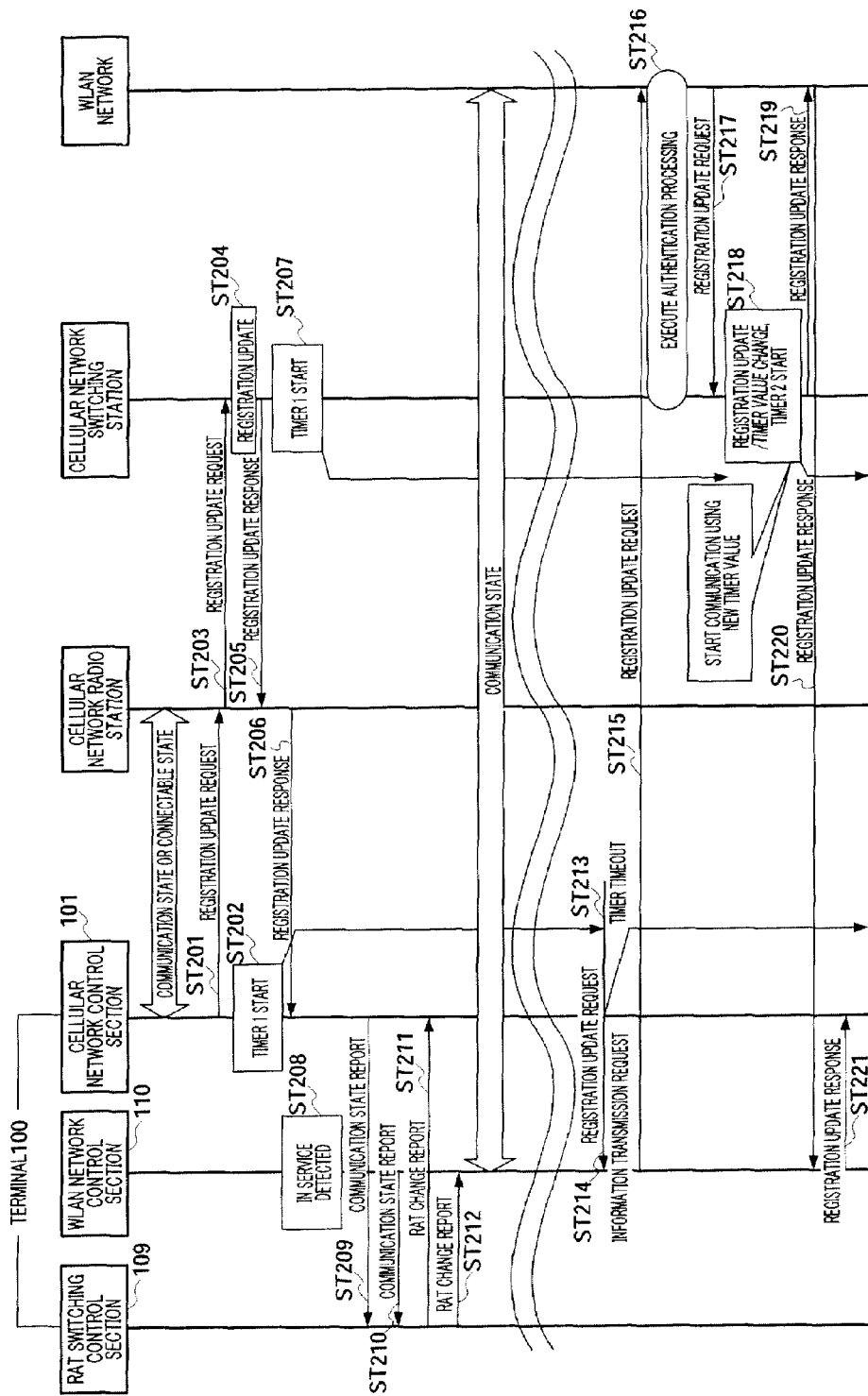
FIG. 5 is a sequence diagram when different timers are used for the terminal and cellular network switching station.

The present embodiment uses same timer 1 even when sending a registration update request using the WLAN, but as shown in FIG. 5, the cellular network switching station may also change the timer value in ST218 and use timer 2 having a timer value different from that of timer 1 of cellular network control section 101. The method of determining the timer will be described later.

Figure 6:
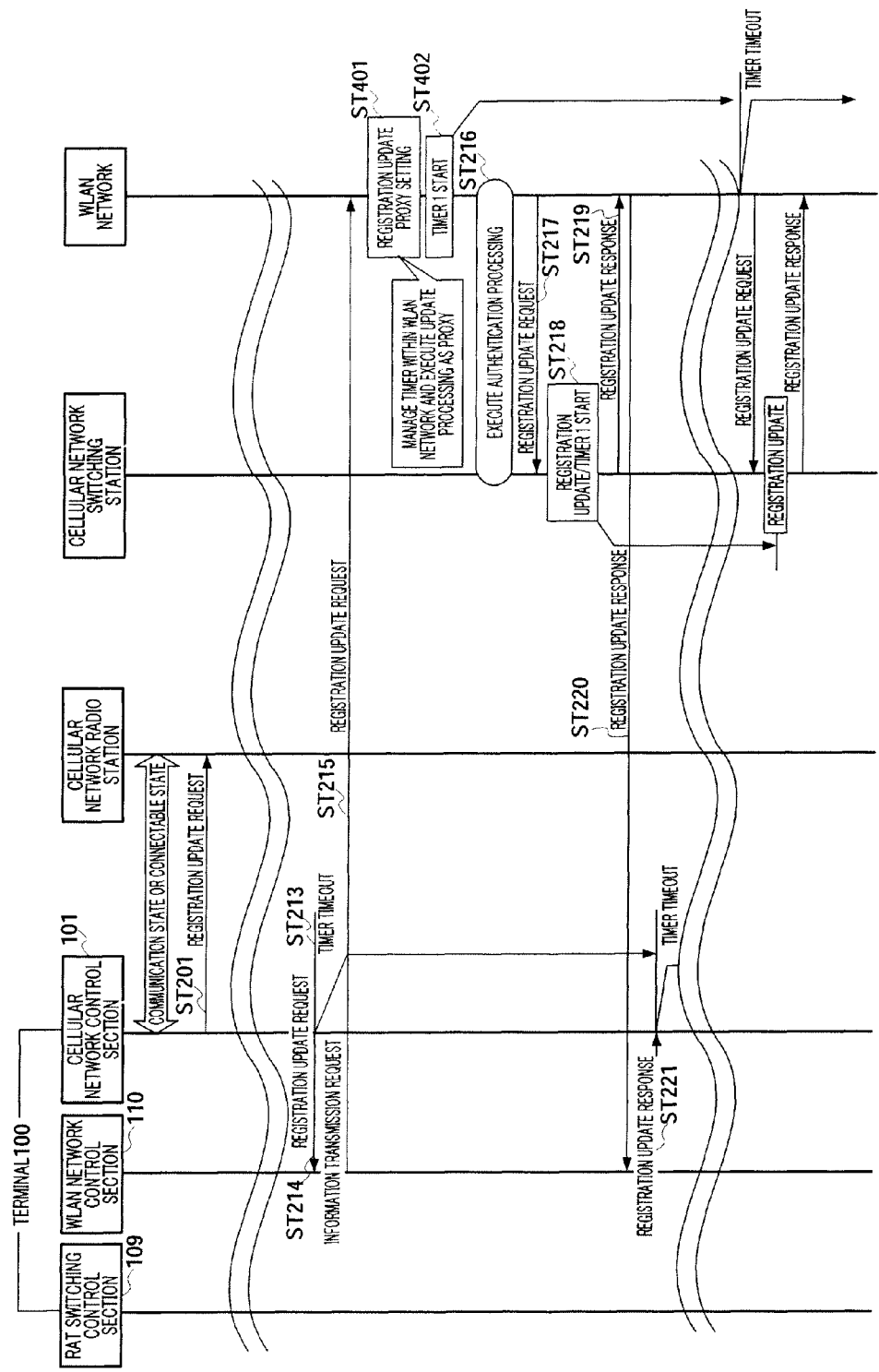
FIG. 6 is a sequence diagram when the WLAN network makes a proxy setting of registration update.

Furthermore, when terminal 100 updates the registration once via the WLAN network and terminal 100 is connected to the WLAN network, the WLAN network may also make a proxy setting of a registration update request in ST401 as shown in FIG. 6, start timer 1 in ST402 and send the registration update request every time timer 1 expires.

Furthermore, it is also possible to combine the above-described two schemes and use a timer value different from the value of timer 1 when the WLAN network updates the registration as a proxy.

Next, the timer setting method will be explained. With regard to timer 1 and timer 2, as generally used in the current GPRS Network (including the GERAN, UTRAN, etc.), a method of reporting a value from the network side to the terminal 100 side is possible. That is, a method of setting two timers separately, that is, one for use when connected to the cellular network (and a registration update is issued using the cellular network) and the other for use when connected to the WLAN network (and a registration update is issued using the WLAN network), and their respective values are reported from the network to terminal 100. This allows terminal 100 to easily determine the timer value from the information on the network to which terminal 100 belongs.

As for the reporting means of this timer 1 and timer 2, it is possible to generally think of a method whereby reporting of both timers is set based on broadcast information and dedicated control information and so on from the cellular network. However, there can also be a method whereby the timer used for the cellular network (here, timer 1) is set by the cellular network and the timer used for the WLAN (here, timer 2) is set by the WLAN, and so on.

The present embodiment has described a case where the state of the cellular network is maintained via the WLAN network, but the opposite possible as well. To be more specific, this can be realized by WLAN network communication control information creation section 116 in FIG. 3 sending a message to cellular network communication control information creation section 107 to be sent to the WLAN network.

Thus, according to Embodiment 1, when the WLAN enters an in-service state while the terminal is communicating with the cellular network, the terminal can keep context such as registration information in the cellular network by regularly sending a registration update request to the cellular network via the WLAN. This eliminates the necessity for using resources in the cellular network and can effectively use radio resources. Furthermore, even when the terminal cannot access the cellular network, it is possible to keep context such as registration information in the cellular network.

Figure 7:
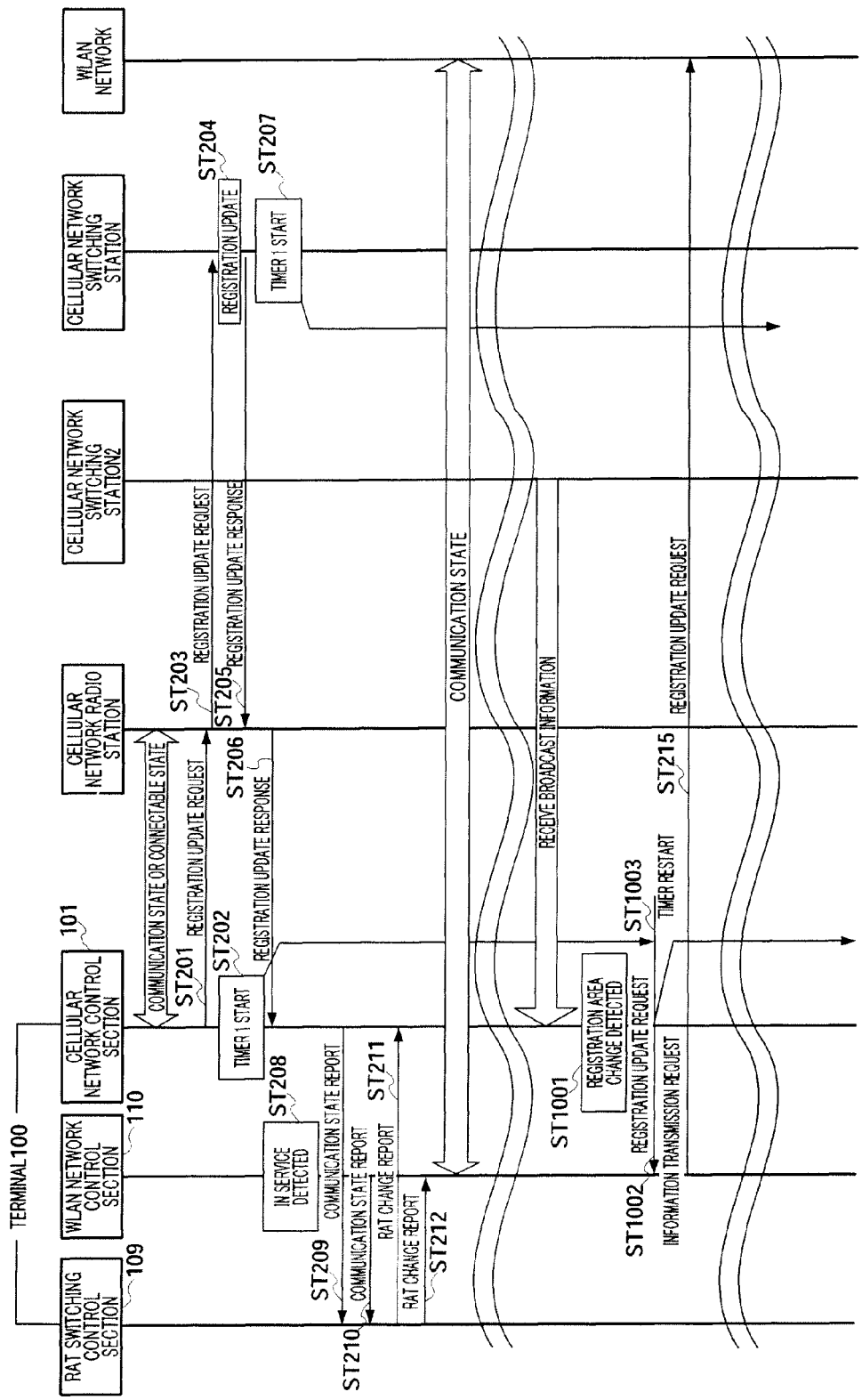
FIG. 7 is a sequence diagram showing another pattern of steps of process in the terminal, radio station and switching station of the cellular network and the WLAN network shown in FIG. 3.

The present embodiment has explained the case where a registration update request is sent based on the timer, but a registration update request may also be sent in other cases. To be more specific, when the terminal detects that the terminal is located outside the registered area, the terminal may be registered in a new area. This registration area is a unit of realizing paging called "Routing Area," "Location Area," "Tracking Area" and so on in the 3GPP. The operation in this case is shown in FIG. 7. However, parts in FIG. 7 common to those in FIG. 4 are assigned the same reference numerals as those in FIG. 4 and overlapping explanations will be omitted.

First, in ST208 to ST211, assume that the terminal checks broadcast information of the cellular network on a regular basis even after having selected the WLAN network. When the signal currently being received from the cellular network radio station weakens as the terminal moves and the signal received from a new cellular network radio station can be received with stronger power, the new cellular network radio station is selected. In this case, since the respective cellular network radio stations are sending the registration areas to which they belong, the terminal can decide whether or not the terminal is located within the range of the area in which the terminal is registered. FIG. 7 assumes that cellular network radio station 2 is a cellular network radio station which belongs to a different area.

In ST1001, cellular network control section 101 of terminal 100 detects a change of the registration area, and, in ST1002, cellular network control section 101 sends a registration update request information transmission request to WLAN network control section 110. Furthermore, in ST1003, cellular network control section 101 restarts timer 1. The processes hereafter, that is, ST215 to ST221 are the same as those in FIG. 4.

Such an operation allows terminal 100 to update the registration area via the WLAN network even when terminal 100 is located outside the area in which terminal 100 is registered. This eliminates the necessity for terminal 100 to be newly connected to the cellular network, and thereby leads to effective utilization of radio resources and a reduction of power consumption of terminal 100.

Figure 8:
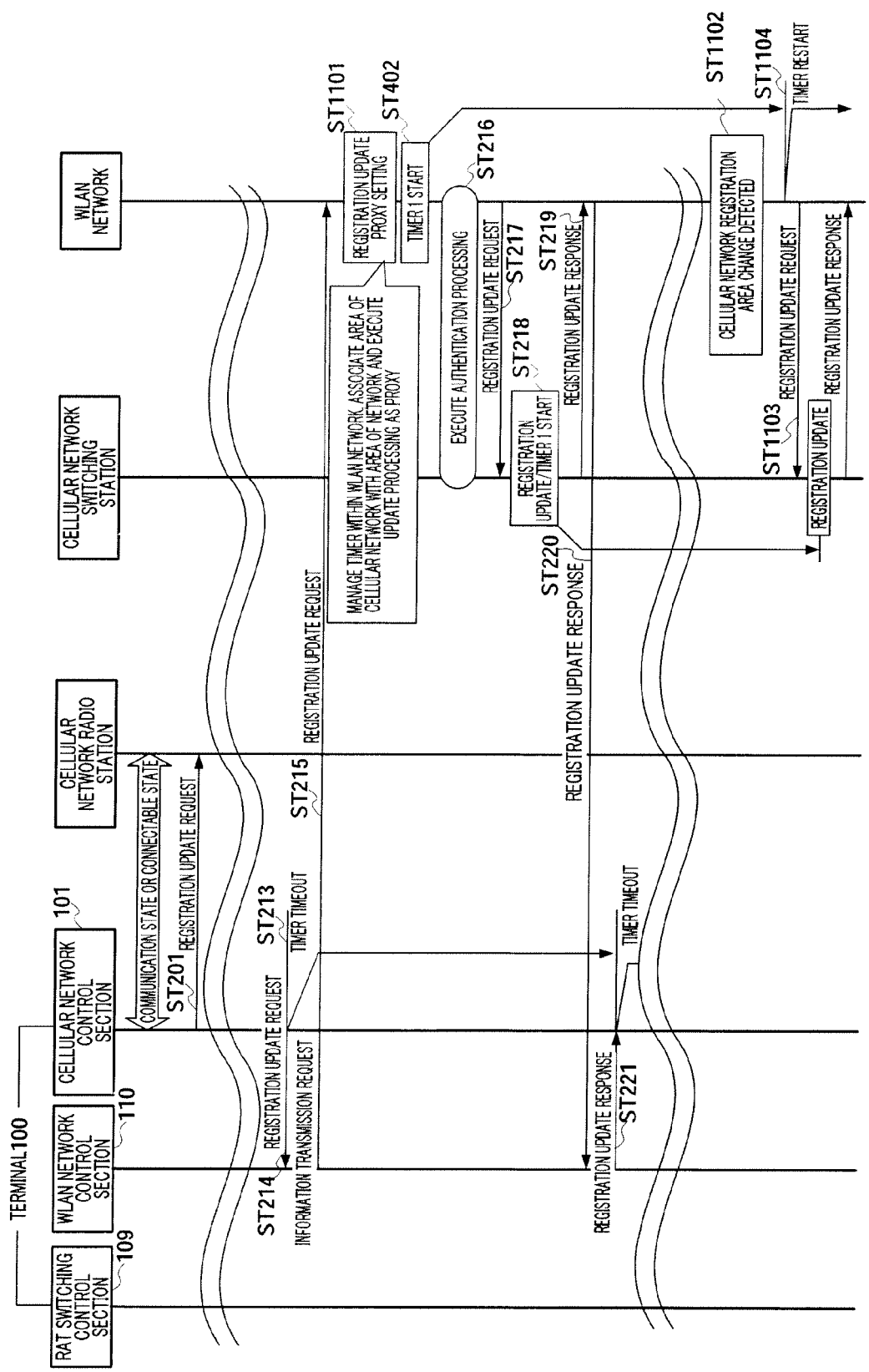
FIG. 8 is a sequence diagram showing further steps of process of the terminal, radio station and switching station of the cellular network and the WLAN network shown in FIG. 3.

Providing the WLAN network with such a function can also reduce the transmission processing load on terminal 100. The operation in this case is shown in FIG. 8. However, parts in FIG. 8 that are the same as in FIG. 6 are assigned the same reference numerals as those in FIG. 6 and overlapping explanations will be omitted.

In ST1101, in addition to the timer management in ST401, the cellular network areas and the WLAN Network areas are associated. To be more specific, this process is to keep track of geographic positions such as tracking areas (or routing areas, location areas, etc.) of the cellular network and an access point of the WLAN network. By so doing, it is possible to know to which tracking area (or routing area, location area, etc.) in the cellular network the terminal belongs, from to which WLAN network access point the terminal is connected to.

In ST1102, it is detected from the movement of the access point in the WLAN network of the terminal that the terminal goes out of the area (tracking area) of the cellular network in which the terminal is actually registered and has moved to a different area.

In ST1103, the WLAN network requests the cellular network switching station to update the registration and restarts timer 1 in ST1104.

With regard to the timer restart in ST1003 shown in FIG. 7 and in ST1104 shown in FIG. 8, the timer may be reset first and then may be started after a registration update response is received in response to a registration update request.

Embodiment 2

Figure 9:
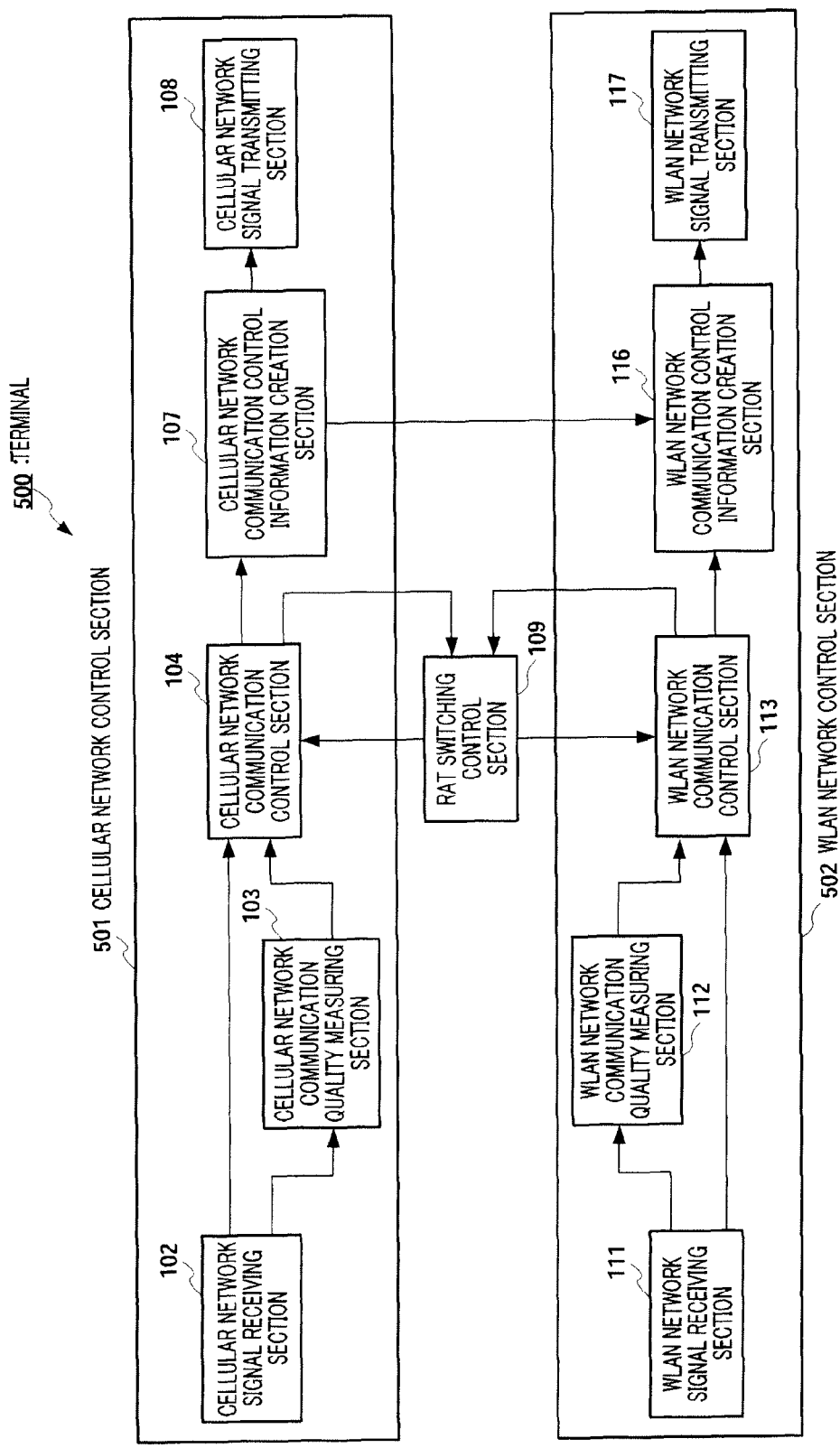
FIG. 9 is a block diagram showing a configuration of a terminal according to Embodiments 2 and 3 of the present invention.

FIG. 9 is a block diagram showing a configuration of terminal 500 according to Embodiment 2 of the present invention. The configuration shown in FIG. 9 results from excluding cellular network higher control section 105 and cellular network higher control information creation section 106 in cellular network control section 101, and WLAN network higher control section 114 and WLAN network higher control information creation section 115 in WLAN network control section 110 from the configuration of terminal 100 shown in FIG. 3, and the rest of the configuration is the same as in FIG. 3.

Figure 10:
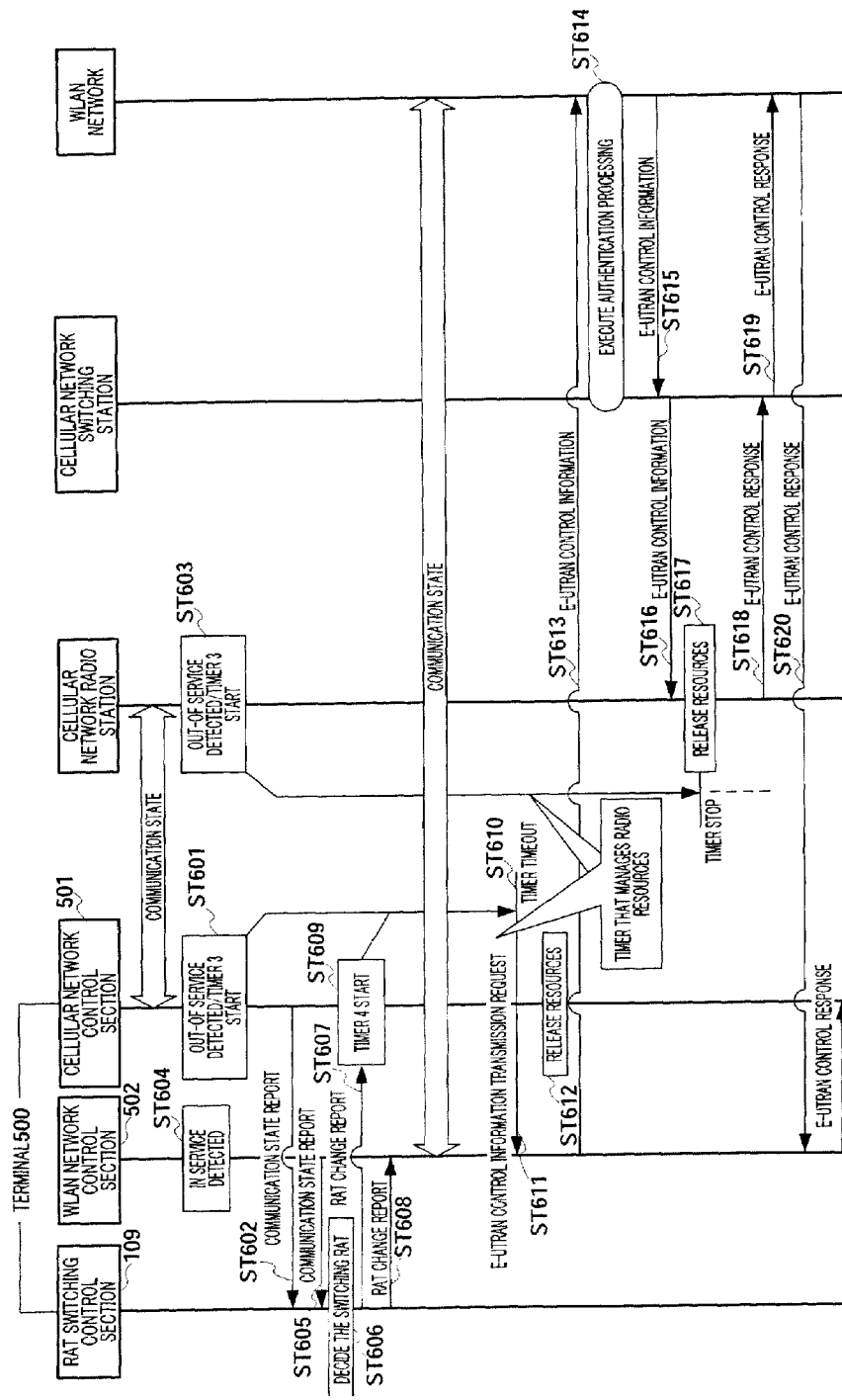
FIG. 10 is a sequence diagram showing steps of process in the terminal, radio station and switching station of the cellular network and the WLAN network having the configuration shown in FIG. 9.

Steps of process in terminal 500 having the configuration shown in FIG. 9, radio station and switching station of the cellular network and the WLAN network will be explained using FIG. 10. FIG. 10 shows a case where terminal 500 moves out of the coverage of the cellular network while terminal 500 is communicating with the cellular network, the cellular system enters an out-of-service state, terminal 500 enters the coverage of the WLAN network substantially at the same time and the WLAN enters an in-service state.

In FIG. 10, given conditions that cellular network control section 501 of terminal 500 is communicating with the cellular network radio station, upon detecting "Out-of Service" of the cellular system in ST601, cellular network control section 501 sets and starts timer 3 for determining the timing to release radio resources, and, in ST602, cellular network control section 501 reports the communication state to RAT switching control section 109.

Furthermore, upon detecting "Out-of Service" of the terminal in ST603, the cellular network radio station sets and starts timer 3 having the same value as that determined in cellular network control section 501. As the timer value used here, the same value is used for terminal 500 and the network for simplicity, but different timer values may also be used.

WLAN network control section 502 of terminal 500 detects "In Servicer" of the WLAN in ST604 and reports the detection result in ST604 (i.e. communication state report) to RAT switching control section 109 in ST605.

In ST606, RAT switching control section 109 of terminal 500 decides switching, addition and deletion and so on of the RAT based on the state of communication with the cellular network and the WLAN network. Here, since "Out-of Service" has been reported from cellular network control section 501 and "In Service" has been reported from WLAN network control section 502, RAT switching control section 109 decides that the cellular network is switched to the WLAN network.

In ST607, the decision result (i.e. RAT change) in ST606 is reported to cellular network control section 501, and, in ST608, the same decision result (i.e. RAT change) in ST606 is reported to WLAN network control section 502. Since this time point is before timer 3 in cellular network control section 501 expires, there still remain radio resources for the cellular network and the cellular network radio station also secures the radio resources.

Having acquired the RAT change report from RAT switching control section 109, cellular network control section 501 stops timer 3, sets and starts timer 4 in ST609. However, timer 4 has a smaller value than timer 3.

In ST610, timer 4 of cellular network control section 501 started in ST609 expires, and, in ST611, cellular network control section 501 sends an E-UTRAN control information transmission request to WLAN network control section 502. Furthermore, in ST612, cellular network control section 501 also releases the radio resources of the subject terminal.

In ST613, WLAN network control section 502 which has received the E-UTRAN control information transmission request from cellular network control section 501 sends E-UTRAN control information to the WLAN network. This E-UTRAN control information includes information for commanding the cellular network radio station to release the radio resources.

In ST614, the WLAN network receives the E-UTRAN control information, carries out authentication processing with the cellular network switching station, and, in ST615, the WLAN network transfers the E-UTRAN control information to the cellular network switching station.

In ST616, the cellular network switching station transfers the received E-UTRAN control information to the cellular network radio station, and, in ST617, the cellular network radio station which has received the E-UTRAN control information releases the radio resources according to the command for releasing the E-UTRAN radio resources included in the E-UTRAN control information and stops timer 3 in cellular network radio station.

In ST618, the cellular network radio station sends an E-UTRAN control response to the cellular network switching station, and, in ST619, the cellular network switching station sends an E-UTRAN control response to the WLAN network. Furthermore, in ST620, the WLAN network sends an E-UTRAN control response to WLAN network control section 502, and, in ST621, WLAN network control section 502 sends an E-UTRAN control response to cellular network control section 501.

Such processing can release the radio resources instantaneously and assign the released radio resources to other terminals, thereby enabling effective use of radio resources.

Thus, according to Embodiment 2, when the cellular system enters an out-of-service state and the WLAN enters an in-service state in the terminal connected to the cellular network, commanding the release of radio resources used by the cellular network via the WLAN allows the radio resources to be released instantaneously and allows effective use of radio resources.

The present embodiment has explained timer 4 to have a shorter period than timer 3, but setting the value of timer 4 to "0" can advance the release of the radio resources.

Furthermore, the present embodiment has explained that the terminal releases radio resources when timer 4 of the terminal expires, but the terminal may also release the radio resources when the cellular network control section receives an E-UTRAN control response.

Furthermore, the present embodiment has described radio resources as to be completely released, but the radio resources to be assigned may also be reduced. To be more specific, a new terminal setting may also be made including information on radio resources used for an E-UTRAN control response.

Furthermore, timer 3 and timer 4 used in the present embodiment can also be set in the same way as the setting methods of timer 1 and timer 2 used in Embodiment 1.

Embodiment 3

The configuration of a terminal according to Embodiment 3 of the present invention is the same as in Embodiment 2 shown in FIG. 9, and therefore FIG. 9 will be used and detailed explanations thereof will be omitted.

Figure 11:
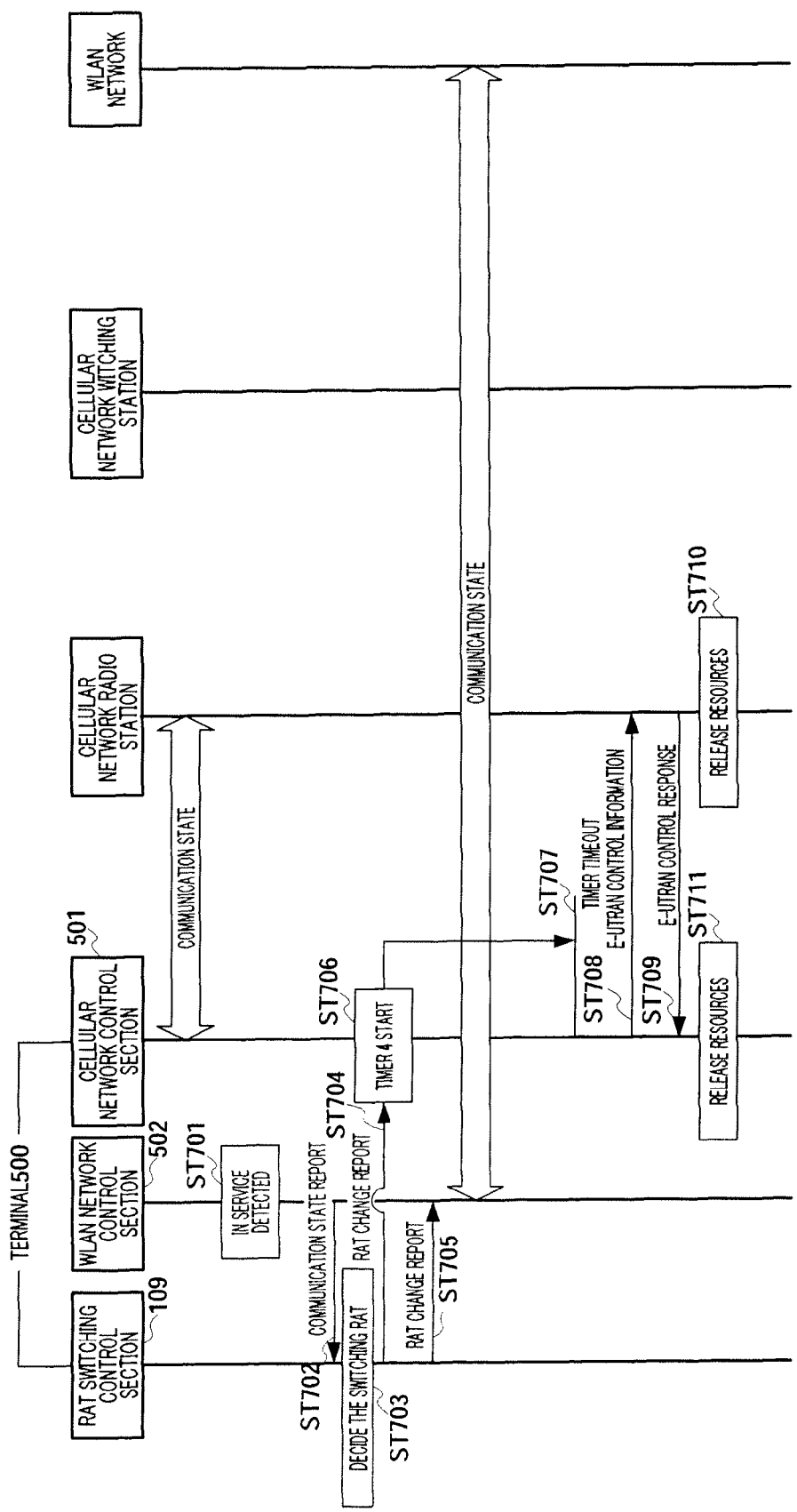
FIG. 11 is a sequence diagram showing steps of process in the terminal, radio station and switching station of the cellular network and the WLAN network according to Embodiment 3 of the present invention.

Steps of process in the terminal, radio station and switching station of the cellular network and the WLAN network according to Embodiment 3 of the present invention will be explained using FIG. 11. FIG. 11 shows a case where terminal 500 enters the coverage of the WLAN network while terminal 500 is communicating with the cellular network and the cellular network and WLAN enter an in-service state.

In FIG. 11, given conditions that cellular network control section 501 of terminal 500 is communicating with the cellular network radio station, WLAN network control section 502 of terminal 500 detects "In Service" of the WLAN in ST701, and reports the detection result in ST701 (i.e. communication state report) to RAT switching control section 109 in ST702.

In ST703, RAT switching control section 109 of terminal 500 decides switching, addition and deletion of the RAT based on the state of communication with the cellular network and WLAN network. Here, since "In Service" is reported from WLAN network control section 502, RAT switching control section 109 determines an addition of RAT, that is, addition of the WLAN network.

In ST704, the decision result (i.e. RAT change) in ST703 is reported to cellular network control section 501, and, in ST705, the same decision result (i.e. RAT change) in ST703 is reported to WLAN network control section 502.

Having acquired the RAT change report from RAT switching control section 109, cellular network control section 501 sets and starts timer 4 in ST706. However, suppose timer 4 has the same timer value used in Embodiment 2.

In ST707, timer 4 of cellular network control section 501 started in ST706 expires, and, in ST708, cellular network control section 501 sends E-UTRAN control information to the cellular network radio station.

In ST709, the cellular network radio station sends an E-UTRAN control response to cellular network control section 501, and, in ST710, the cellular network radio station releases radio resources according to the E-UTRAN control information. On the other hand, in ST711, cellular network control section 501 receives the E-UTRAN control response and releases the radio resources.

Thus, according to Embodiment 3, when the cellular system and the WLAN are set in an in-service state for the terminal connected to the cellular network, commanding the release of the radio resources used by the cellular network via the cellular system allows the radio resources to be released instantaneously and allows effective use of radio resources.

The present embodiment has described radio resources to be completely released, but the radio resources to be assigned may also be reduced.

The above-described embodiment has described operations between a cellular network and a WLAN network, but the present configuration can also be used between cellular networks. To be more specific, when a cellular network is introduced, the service range thereof may be limited. In such a case, even the service range of a cellular network system is substantially limited as in the case of a WLAN network. Therefore, a widely spread cellular network can be regarded as a cellular network here and a cellular network immediately after a service is started can be regarded as a WLAN network here.

Also, although cases have been described with the above embodiment as examples where the present invention is configured by hardware, the present invention can be realized by software as well.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI", or "ultra LSI" depending on differing extents of integration.

Furthermore, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Furthermore, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-058342, filed on Mar. 3, 2006, including the specification, drawings and abstract, is incorporated herein by reference in its entirety.

INDUSTRIAL APPLICABILITY

The radio communication terminal apparatus, radio communication control station apparatus and radio communication method according to the present invention can efficiently manage, when a terminal compatible with a plurality of different RATs moves from one RAT to another, a context such as radio resources and registration information assigned to the terminal, and are applicable, for example, to a mobile communication system.

The invention claimed is:

1. A radio communication terminal apparatus configured to access a plurality of networks including a cellular network and a wireless LAN network, comprising:
- a detection section to detect an in-service state or out-of-service state of each of the cellular network and the wireless LAN network;
- a switching section to switch a network to which the radio communication terminal apparatus is connected, based on the detected in-service state or the detected out-of-service state of the cellular network and the wireless LAN network;
- a requesting section to, when a connection to the cellular network is switched to a connection to the wireless LAN network, regularly request the cellular network to keep a context including registration information in the cellular network via the wireless LAN network; and
- a command section to command a change of a timer in the cellular network that manages the storage of the context including the registration information in the cellular network via the wireless LAN network.

2. A radio communication control station apparatus comprising:
- a receiving section to receive a command for regularly requesting a cellular network to keep a context including registration information in the cellular network from a radio communication terminal apparatus;
- a requesting section to make a request according to the command; and
- a reporting section to report a timer value indicating a timing for updating the registration information in the cellular network while the radio communication terminal apparatus is communicating with the cellular network and a timer value indicating a timing of updating the registration information in the cellular network while the radio communication terminal apparatus is connected to the wireless LAN network to the radio communication terminal apparatus.

* * * * *